G. B. COLEMAN.
ELECTRIC MOTOR.
APPLICATION FILED JAN. 3, 1921.

1,438,361.

Patented Dec. 12, 1922.

Fig 1 - II

INVENTOR
George B Coleman
BY
Miller & Henry
ATTORNEYS

Patented Dec. 12, 1922.

1,438,361

UNITED STATES PATENT OFFICE.

GEORGE B. COLEMAN, OF SAN FRANCISCO, CALIFORNIA, ASSIGNOR TO MAJIK ELECTRIC APPLIANCE COMPANY, OF SAN FRANCISCO, CALIFORNIA, A CORPORATION OF CALIFORNIA.

ELECTRIC MOTOR.

Application filed January 3, 1921. Serial No. 434,518.

*To all whom it may concern:*

Be it known that I, GEORGE B. COLEMAN, a citizen of the United States, and resident of the city and county of San Francisco, State of California, have invented new and useful Improvements in Electric Motors, of which the following is a specification.

My invention has for its principal object the arrangement of parts and construction whereby I attain a complete assembled motor of miniature size suitable for holding in the hand, and is particularly adapted to dental work or the operation of small household devices and clippers and brushes and the like. By my construction a preferred form of which is set forth below, it will be seen that the cost of manufacture and particularly the windings of the several magnets, is much cheaper than in other types; also that the arrangement of the rotor and stator is such that a maxium leverage about the axis of rotation or a maximum torque is obtainable within limits of size.

Another object of my invention is an adjustment whereby any required variation of speed may be readily produced by varying the air gap between the stator and the rotor. This I prefer to accomplish by a positive adjustment in an axial direction of the rotor. With the arrangement of the coils which I employ a greater number of turns may be employed on the several coils than in other types of miniature motors, and I employ high resistance windings so that the motor is readily applicable to operation on commercial lighting circuits, utilizing but comparatively few milliamperes. In ths way the coils are protected from burnouts which would otherwise occur with low resistance windings.

These objects I attain for example by the preferred construction set forth in the drawing and description below, which construction consists of a plurality of magnets assembled about the axis of the rotor shaft and which form a stator, and a second plurality of similar magnets mounted on said shaft. All of these magnets consist of cores over which spools containing the necessary windings may be readily slipped. The rotor is provided with a suitable commutator and the main casing or shell supports a pair of brushes engaging said commutator. The stator and rotor are of the same diameters and the windings and magnetic cores are disposed parallel with and symmetrically about the axis. The rotor shaft extends through one end of the casing and is provided with a suitable end fitting preferably insulated so that any device which it is desired to operate may be slipped thereon and engaged to drive from the said shaft. The opposite end of the shaft is carried in a positive bearing held against axial movement and the said bearing is carried in a suitable sleeve and made adjustable and the entire bearing, and therefore the rotor shaft carried in it, is made axially adjustable by a set screw engaging one side of the bearing and a compressed spring engaging the opposite side and holding the bearing against the said set screw. The set screw I extend beyond the exterior of the casing so that during operation of the motor the air gap may be varied between the stator and the rotor and consequently varying the revolutions at which the rotor will operate under given conditions of electric service supply and load.

By referring to the accompanying drawings my invention will be made clear.

Figure 1 is a longitudinal view of the interior construction of my motor with the outer casing or shell shown in section, and taken on the right angled line I—I of Fig. 2.

Throughout the figures similar numerals refer to identical parts.

Figure 2:
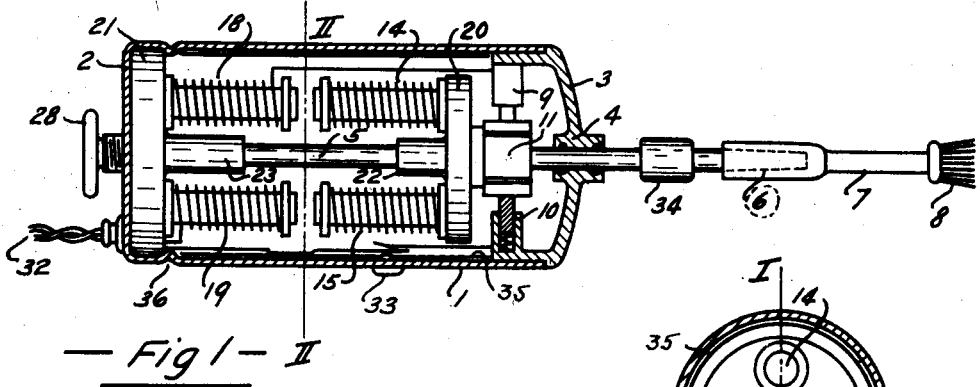
Figure 2 is a cross section of Fig. 1 on the line II—II.
Figure 3:
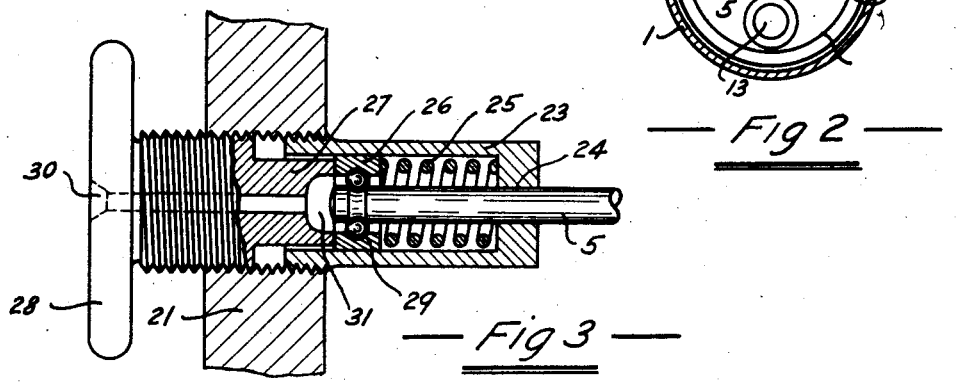
Fig. 3 is an enlarged sectional detail of the shaft bearing showing the adjustable features thereof.

The motor is adapted to be housed within a casing indicated by the numeral 1 having a rear end 2 and a cover member 3 and preferably an insulated lining 35. The cover is provided with a bearing 4 adapted to carry the rotor shaft 5. This shaft 5 may be tapered or provided with any suitable fastening means as at 6 and adapted to carry an extension member or motor operated connection 7 which I have shown in the drawings as having a brush 8 suitable for brushing the teeth. Fixed within the motor housing are brush standards 9 and 10 arranged at right angles to each other and carrying coil springs and carbon or other suitable brushes whereby electrical connection is established through the commutator to the coils in the rotor in well known ways. The commutator I have shown at 11 consisting of four segments electrically connected to the coils 12, 13, 14, 15 of the rotor. Opposite the rotor coils are arranged the plurality of stator coils as 16, 17, 18 and 19, and the coils of the stator and rotor are arranged in electrical series through the brush and commutator contacts so that current will flow in the rotor and be periodically reversed through the commutator such that the rotor coils will be attracted by one group of stator magnets and repelled by the other intermediate set of stator magnets. In this way motion will be imparted to the rotor and thence to the shaft 5, it being understood of course that the several magnets 12, 13, 14, 15, 16, 17, 18 and 19 are suitably mounted upon bases of magnetic material 20 and 21 respectively. The base 20 I prefer to form of disc shape having a hub 22 mounted upon the said shaft 5 and the base 21 I prefer to form of a shape suited to fit snugly within the casing 1. When this base 21 is fitted in place within casing 1, I roll a bead or groove 36 in the said casing 1, thus crimping the base 21 permanently in place in the casing 1 and against the end plate 2. This secures alignment of the axis of symmetry of the magnets 16, 17, 18 and 19 with the axis of the shaft 5. In the center of the base 21 I fit the bearing standard 23 carrying a bearing 24 about the shaft 5 and having an internally disposed coil spring 25 within the said standard. This spring is normally under compression tending to force the bearing shell 26 against the end 27 of the set screw 28, which set screw passes through the block 21 and cover 22 and by its rotation varies the position of the bearing shell 26 within the sleeve 23. The bearing shell 26 may be provided with a bearing of smaller diameter than the shaft 5 and engage a groove therein, or may preferably form a part of a ball bearing 29, which latter engages with the shaft 5 as shown in Fig. 3. By this construction it will be seen that the rotation of the screw 28 will advance the bearing 26 and shaft 5 to increase the air gap between the stator and the rotor or by a rotation of the set screw 28 in the opposite direction, the coil spring 25 will force the shaft 5 and therefore the rotor in the direction towards the stator and reduce the air gap therebetween and consequently increase the speed. At 30 I have shown an oil hole through the screw 28 for introducing lubricant as may be required within the pocket 31 and shaft step bearing 26. At 32 are electrical connections from a suitable source of electric energy not shown. The cover plate 3 is adapted to slide within the casing 1 and to either be compressed therein or engage by suitable holding means in any well known way.

It is to be understood that the driven member 7 is interchangeable on the end 6 of the shaft 5 with other devices having similar sockets whereby devices requiring power, as polishing wheels, etc., may be readily fitted thereon at the joint 6. At 33 is shown a switch of any well known type for starting or stopping the motor. I prefer to provide the extension of the shaft 5 with an insulating union as at 34 whereby the body of the motor and of its parts are thoroughly insulated from the terminal device, especially where the motor is intended to be used for dental work.

Figure 4:
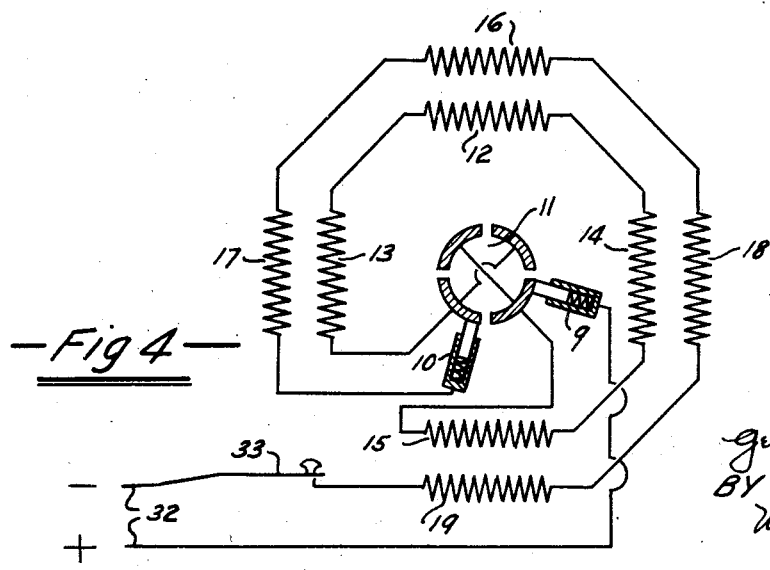
Fig. 4 is a diagrammatic showing of the windings and circuit connections, commutator and brushes.

The operation is as follows:

Terminals 32 are connected to any suitable source of electrical energy as the well known socket for incandescent lamps, switch 33 is closed and coils 12, 13, 14 and 15 of the rotor and coils 16, 17, 18 and 19 are all energized. The coils of the rotor as shown in Fig. 4 have just passed through a cycle of attraction and in the next instant will be polarized the same as the adjacent coils of the stator and will therefore be repelled until coil 12 comes very close to coil 18 and during which time coil 12 has been attracted by coil 18. A similar cycle of attractions and repulsions takes place between the other coils of the stator and rotor thus causing a rotation of the shaft.

The intensity of the magnetic field determines the speed at which the motor will operate for any given load and this field intensity may be varied by the set screw 28, increasing or decreasing the air gap between the stator and the rotor, and consequently varying the speed of the motor independent of any variation of the voltage or other external resistance or control.

I claim:

1. In a dynamo electric machine, a hollow casing, a shaft rotatably mounted within the casing, a rotor mounted on the shaft, and a stator axially displaced from the rotor and cooperating with the rotor, this stator having a base held at one end of the hollow casing by a crimp in said casing.

2. In a dynamo electric machine, a shaft, a stator having cores extending parallel to the shaft, a rotor mounted on the shaft cooperating with the stator and having cores separated by an air gap from the cores of the stator, and means for adjusting this gap comprising a stationary guide, a bearing for the shaft slidably mounted in the guide, said bearing and shaft being so arranged that there can be no relative axial movement between them, a spring urging said bearing in one direction and a thumb nut urging the bearing in the other direction.

GEORGE B. COLEMAN.